United States Patent
Wang et al.

(10) Patent No.: US 11,552,791 B2
(45) Date of Patent: Jan. 10, 2023

(54) ACCESS TECHNOLOGY AGNOSTIC SERVICE NETWORK AUTHENTICATION

(71) Applicant: Huawei Technologies Co., Ltd., Shenzhen (CN)

(72) Inventors: Zhibi Wang, Woodridge, IL (US); Marcus Wong, Green Brook, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 17/079,228

(22) Filed: Oct. 23, 2020

(65) Prior Publication Data

US 2021/0044427 A1    Feb. 11, 2021

Related U.S. Application Data (63) Continuation of application No. PCT/US2019/033387, filed on May 21, 2019.
(Continued)

(51) Int. Cl.
*H04W 12/06* (2021.01)
*H04L 9/08* (2006.01)
(Continued)

(52) U.S. Cl.
CPC ............ *H04L 9/085* (2013.01); *H04L 9/0825* (2013.01); *H04L 9/14* (2013.01); *H04L 9/30* (2013.01);
(Continued)

(58) Field of Classification Search
CPC ................................................. H04W 12/069
See application file for complete search history.

(56) References Cited

U.S. PATENT DOCUMENTS

2004/0015692 A1   1/2004  Green et al.
2010/0306546 A1  12/2010  Willey et al.
(Continued)

FOREIGN PATENT DOCUMENTS

CN         106717044 A      5/2017

OTHER PUBLICATIONS

China Mobile, "pCR Security enhancement to the attach procedure relying on the public key of the home network", 3GPP TSG SA WG3 (Security) Meeting #88 , S3-171918, Aug. 7-11, 2017, 8 pages, Dali, China.
(Continued)

*Primary Examiner* — David J Pearson
(74) *Attorney, Agent, or Firm* — Slater Matsil, LLP (57) ABSTRACT

Serving network authentication and validation by a UE includes encrypting an identifier associated with the UE using a first instance of a public key associated with a serving network to which the UE is attempting to gain access; transmitting the identifier to the serving network; receiving from the serving network an authentication vector containing a second instance of the public key, the second instance of the public key having been encrypted using a key shared by the UE and a home network associated with the UE; decrypting the second instance of the public key using the key shared by the UE and the home network; comparing the first instance of the public key to the second instance of the public key; and when the first instance and the second instance are the same, determining that the home network has authenticated the serving network.

23 Claims, 6 Drawing Sheets

Related U.S. Application Data

(60) Provisional application No. 62/674,821, filed on May 22, 2018.

(51) Int. Cl.
  *H04L 9/14* (2006.01)
  *H04L 9/30* (2006.01)
  *H04W 12/069* (2021.01)

(52) U.S. Cl.
  CPC ......... *H04W 12/06* (2013.01); *H04W 12/069* (2021.01)

(56) References Cited

U.S. PATENT DOCUMENTS

| | | | |
|---|---|---|---|
| 2013/0013923 A1* | 1/2013 | Thomas | H04W 12/06 713/168 |
| 2014/0003605 A1 | 1/2014 | Luft et al. | |
| 2015/0271668 A1 | 9/2015 | Sun et al. | |
| 2016/0094988 A1* | 3/2016 | Lee | H04L 9/0825 380/270 |
| 2017/0264439 A1 | 9/2017 | Muhanna et al. | |
| 2017/0330179 A1 | 11/2017 | Song et al. | |
| 2018/0013568 A1 | 1/2018 | Muhanna et al. | |
| 2018/0367978 A1* | 12/2018 | Targali | H04L 63/0442 |
| 2020/0322794 A1* | 10/2020 | Baltatu | H04W 12/04 |

OTHER PUBLICATIONS

ZTE, China Unicom, "EPS Authentication with hiding keys assisted by UE—EPS AKA+", TSG SA WG3 (Security) Meeting #87, S3-171052, May 15-19, 2017, 3 pages, Ljubljana, Slovenia.

* cited by examiner

ACCESS TECHNOLOGY AGNOSTIC SERVICE NETWORK AUTHENTICATION

CROSS-REFERENCE TO RELATED APPLICATIONS

This application is a continuation of International Application No. PCT/US19/33387 filed on May 21, 2019 and entitled "Access Technology Agnostic Service Network Authentication", which claims the benefit of U.S. Provisional application No. 62/674,821, filed on May 22, 2018 and entitled "Access Technology Agnostic Service Network Authentication", which applications are hereby incorporated by reference in their entireties.

TECHNICAL FIELD

The present disclosure relates generally to a system and method for wireless communications and, in particular embodiments, to authentication and validation for next generation serving networks.

BACKGROUND

A user of a mobile telecommunication device such as a user equipment (UE) may subscribe to telecommunication services through a service provider. The network through which the provider provides services to the user is referred to as the user's home network. At times, the user may access telecommunication services through a network other than the user's home network, such as when the user is in a physical location where the home network is not directly available. Such a network is referred to as a serving network. In existing telecommunication systems, the provider of the home network and the provider of the serving network may have a roaming agreement that allows the user to access network services via the serving network. The roaming agreement typically specifies how services should be provided by the serving network, how the services are to be billed, and how communication via the home network and the serving network is to occur.

However, users of next generation telecommunication services may access network services dynamically and may use serving networks in an unpredictable fashion. For example, an airport or other large public venue may operate a serving network that users may access on a temporary basis. As another example, a large corporation may operate its own telecommunication network for use by its employees but may allow non-employees to access its network for a fee. As another example, an enterprise may create a serving network in a location with limited access to other networks and charge users a fee while accessing its network. Such networks may or may not have a roaming agreement with a UE user's home network. In addition, such serving networks may use different access technologies for access to their networks, such as Long Term Evolution, Wi-Fi, or WiMAX.

SUMMARY

In accordance with an embodiment of the present disclosure, a method for serving network authentication and validation by a UE comprises encrypting an identifier associated with the UE using a first instance of a public key associated with a serving network to which the UE is attempting to gain access; transmitting the identifier to the serving network; receiving from the serving network an authentication vector containing a second instance of the public key, the second instance of the public key having been encrypted using a key shared by the UE and a home network associated with the UE; decrypting the second instance of the public key using the key shared by the UE and the home network; comparing the first instance of the public key to the second instance of the public key; and when the first instance of the public key and the second instance of the public key are the same, determining that the home network has authenticated and validated the serving network.

In accordance with another embodiment of the present disclosure, a method for serving network authentication and validation by a serving network comprises receiving, from a UE, an identifier associated with the UE, the identifier having been encrypted using a first instance of a public key associated with the serving network; transmitting, to a home network associated with the UE, the encrypted identifier and the first instance of the public key associated with the serving network; receiving from the home network an authentication vector containing a second instance of the public key, the second instance of the public key having been encrypted using a key shared by the UE and the home network; extracting an expected response value from the received authentication vector; and transmitting the remaining authentication vector to the UE.

In accordance with another embodiment of the present disclosure, a method for serving network authentication and validation by a home network comprises receiving, from a serving network, a first instance of a public key associated with the serving network and an identifier associated with a UE, the identifier having been encrypted using a private key associated with the serving network; using the first instance of the public key as a digital identifier to obtain previously established authentication and validation information associated with the serving network; when the serving network has been authenticated and validated, generating an authentication vector containing an AUTN value combined with the first instance of the public key that has been encrypted with a key shared by the UE and the home network; and transmitting the authentication vector to the serving network.

In accordance with another embodiment of the present disclosure, a method for three-way authentication comprises transmitting, by a first entity, a first instance of a public key associated with the first entity together with system clock information associated with the first entity, the system clock information having been encrypted using a private key associated with the first entity; receiving, by a second entity, the first instance of the public key and the system clock information; determining, by the second entity, that the first instance of the public key and the private key are a legitimate key pair by decrypting the system clock information using the first instance of the public key; encrypting, by the second entity, an identifier associated with the second entity using the first instance of a public key; transmitting, by the second entity, to the first entity, the identifier; decrypting, by the first entity, the identifier to determine information in the identifier identifying a third entity associated with the second entity; encrypting, by the first entity, the identifier using the private key associated with the first entity; transmitting, by the first entity, to the third entity, the identifier and the first instance of the public key; using, by the third entity, the first instance of the public key as a digital identifier to obtain previously established authentication and validation information associated with the first entity; transmitting, by the third entity, to the first entity, in an authentication vector, a second instance of the public key created by encrypting the first instance of the public key using a key shared by the second entity and the third entity, and the authentication and validation information of the first entity by the third entity; extracting, by the first entity, an expected response from the authentication vector containing the second instance of the public key; forwarding, by the first entity, to the second entity, the remaining authentication vector along with authentication and validation information and the second instance of the public key; decrypting, by the second entity, the second instance of the public key using the key shared by the second entity and the third entity; comparing, by the second entity, the first instance of the public key to the second instance of the public key; and when the first instance of the public key and the second instance of the public key are determined to be the same, determining that the third entity has authenticated and validated the first entity.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Embodiments of the present disclosure are discussed in detail below. It should be appreciated, however, that the present disclosure provides many applicable novel concepts that can be embodied in a wide variety of specific contexts. The specific embodiments discussed are merely illustrative of specific ways to make and use the embodiments and do not limit the scope of the disclosure.

The embodiments disclosed herein provide a serving network authentication and validation mechanism. The disclosure is exemplified using the Authentication and Key Agreement (AKA) procedure but can be implemented in other authentication mechanisms. The embodiments can also be implemented in any type of access technology and are thus agnostic with respect to the type of access network.

In the next generation of network services, a serving network may or may not have a service agreement with a subscriber's home network. In order for a UE to access a serving network safely and reliably, serving network authentication and validation is important. Currently, circumstances may exist where no authentication occurs between a UE and a serving network, and authentication is performed only between the UE and its home network. For example, a UE may attempt to gain access to a serving network that does not have a roaming agreement with the UE's home network. It may be preferable for such a serving network to be authenticated and validated to ensure that the serving network can be trusted. In addition, there is currently no adequate solution for pre-provisioning a UE with a public key for all possible future serving networks, since the serving networks may be dynamic and numerous. It may not be possible for a UE to know in advance all the possible serving networks the UE may visit. Even if a UE knew all the possible serving networks the UE may visit, the UE may not have enough memory to store the large number of public keys for all of the expected serving networks. A complete solution to authenticate and validate a serving network has yet to be developed.

Embodiments of the present disclosure provide methods for authenticating and validating a serving network that may not have a pre-existing roaming relationship with a home network. A serving network public key can be provisioned into a UE as a result of this authentication. Furthermore, a serving network can be validated in addition to being authenticated. That is, the serving network may be given a rating or rank to indicate the level of trust that can be placed in the serving network or the quality of service the serving network provides. With such a validation, an end user can avoid using a serving network that has been authenticated but that may have low trust or provide poor service.

The embodiments can provide the fine granularity of an authentication performed, for example, on a per-access point basis, as opposed to an authentication performed on the entire serving network. Entities can be authenticated with a fine granularity that the public key infrastructure (PKI) cannot match due to the complexity and cost of PKI. For example, since each access point has its own unique identifier, each access point could be individually authenticated and validated based on its identifier.

The embodiments can provide three-way authentication among a UE, a serving network, and a home network without a need for a pre-existing roaming agreement between the serving network and the home network.

In an embodiment, a serving network may charge for services via a blockchain network instead of the charges going through a third-party clearinghouse acting as an intermediary between the home network and the serving network. In addition, a home network may authenticate and validate a serving network via blockchain using a serving network identifier such as a public key, or such as the public address of a serving network smart contract.

The embodiments avoid the single point of failure that may be present in a centralized authentication mechanism and also avoid issues from Certificate Authorities and the Web of Trust, such as the need for a trusted third party and limited accessibility.

Figure 1:
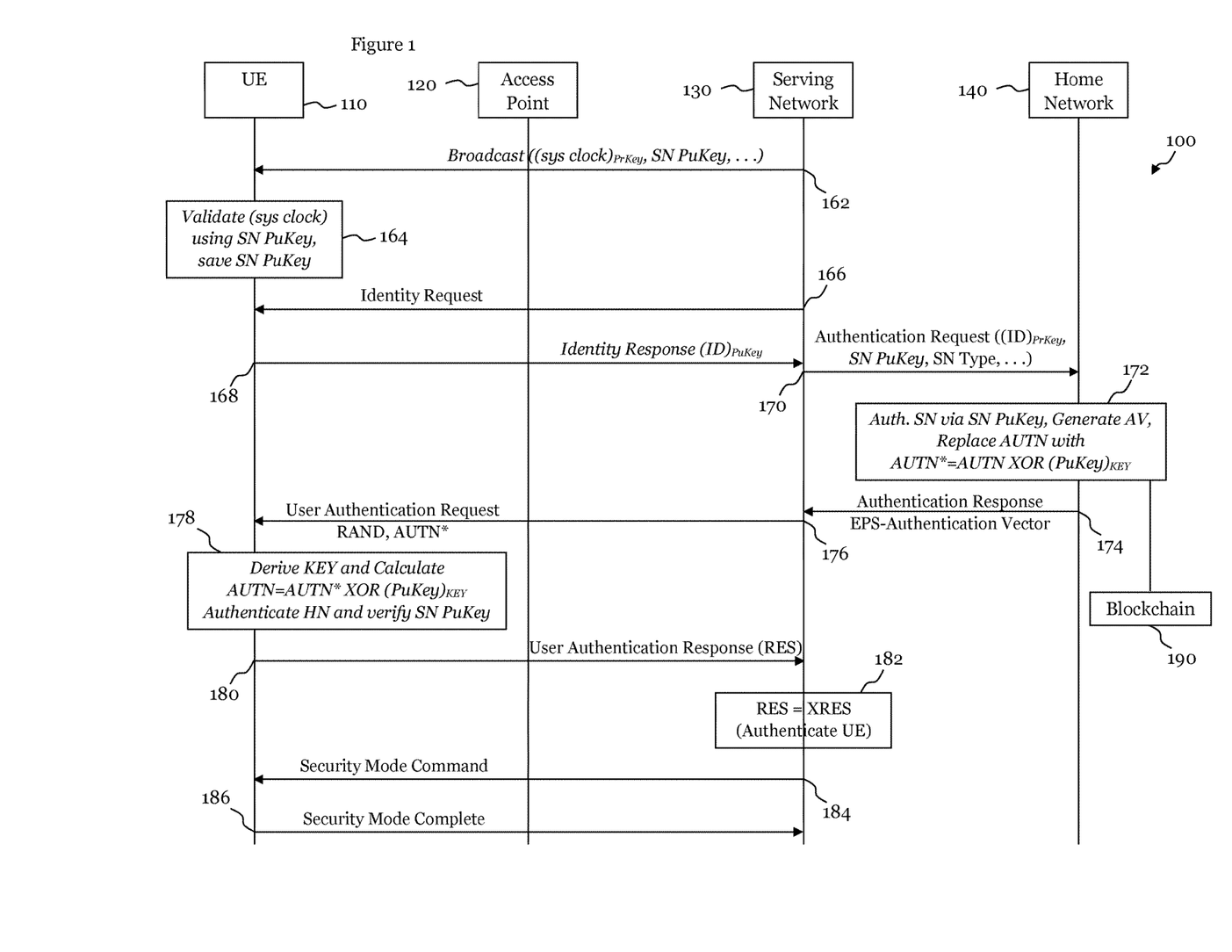
FIG. 1 is a diagram illustrating an embodiment call flow for serving network authentication and validation.

FIG. 1 is a diagram illustrating an embodiment call flow 100 for serving network authentication and validation. In the call flow 100, messages are sent between a UE 110, a serving network 130, and a home network 140. The UE 110 and the serving network 130 may communicate via an access point 120. Alternatively, the serving network 130 may be any individual access point 120. Alternatively, the access point 120 and the serving network 130 may be considered a single entity. Actions described herein as being taken by the serving network 130 or the home network 140 may be taken by one or more components within the serving network 130 or the home network 140. Text in italics in FIG. 1 indicates actions that are different from third generation (3G) or fourth generation (4G) authentication mechanisms.

At event 162, the serving network 130 broadcasts system information including a serving network public key (SN PuKey) and serving network system clock information encrypted using a serving network private key (SN PrKey). Alternatively, other serving network system information could be encrypted using the SN PrKey. At event 164, the UE 110 receives the broadcast and validates the system clock using the SN PuKey. That is, the UE 110 uses the SN PuKey to decrypt the system clock information and thereby ensure that the SN PuKey and the SN PrKey are a legitimate key pair. Still at event 164, the UE 110 saves the SN PuKey for later use in the authentication and validation procedure and for possible use when the UE 110 may attempt to gain access to the serving network 130 again in the future. When the UE 110 attempts to attach to the serving network 130, the serving network 130, at event 166, sends an Identity Request message to the UE 110. In response to the Identity Request message, the UE 110 sends its user identifier (ID) to the serving network 130 in an Identity Response message at event 168. In an embodiment, the UE encrypts the user ID in the Identity Response message using the SN PuKey.

It may be noted that, if the SN PuKey is already provisioned in the UE 110, the serving network 130 is already authenticated. Otherwise, the serving network 130 needs to be authenticated by the home network 140.

Following receipt of the Identity Response message from the UE 110, the serving network 130 decrypts the user ID using the SN PrKey. Using the information in the user ID, the serving network 130 determines the home network 140 associated with the UE 110. The serving network 130 then encrypts the user ID using the SN PrKey to ensure that there is no "man in the middle" interception of the user ID when the serving network 130 sends the user ID to the home network 140. At event 170, the serving network 130 sends an Authentication Request message with the encrypted user ID and the SN PuKey to the home network 140 to obtain an authentication vector.

At event 172, the home network 140 decrypts the user ID using the SN PuKey and determines whether the UE 110 associated with the user ID can legitimately access the serving network 130. The home network 140 then authenticates and validates the serving network 130 using the SN PuKey. That is, the home network 140 uses the SN PuKey to obtain previously established authentication and validation information associated with the serving network 130. The home network 140 then uses that information to determine if the serving network 130 is legitimate and also to determine a known rating or rank for the quality of service and/or level of trust associated with the serving network 130. If the home network 140 determines that the serving network 130 is legitimate and has a rating or rank above a predetermined threshold, the home network allows the UE 110 to gain access to the serving network 130. If more than one serving network 130 is available to the UE 110, the home network 140 may provide the UE access to the serving network 130 with the highest rating or rank. Alternatively, the home network 140 may allow a user of the UE 110 to choose a serving network 130 with an acceptable rating or rank. In an embodiment, the home network 140 authenticates and validates the serving network 130 via a blockchain network 190 using the SN PuKey as the serving network address or as a digital identifier.

With continuing reference to event 172, the home network 140 generates an authentication vector (AV). The authentication vector contains a new digital value that can be referred to as AUTN* and that can be derived from an existing digital value that can be referred to as AUTN. In an embodiment, AUTN* is calculated by performing an XOR operation on AUTN and the SN PuKey that has been encrypted by a key that can be referred to as KEY and that is derived from a key the home network 140 shares with the UE 110. That is, AUTN*=AUTN (XOR) $(PuKey)_{KEY}$. In other embodiments, AUTN may be combined with $(PuKey)_{KEY}$ in other ways. In another embodiment, the home network private key can be used to protect the SN PuKey to be validated by the UE 110, and the UE 110 can use the home network public key to decrypt the home network private key. This prevents a "man in the middle" interception of the SN PuKey and ensures that the SN PuKey is not changed as it is transmitted from the home network 140 to the UE 110. In the authentication vector, AUTN is replaced by AUTN*.

At event 174, the home network 140 sends an authentication vector response containing AUTN* and the SN PuKey to the serving network 130. At event 176, the serving network 130 extracts and retains the expected response (XRES) portion of the authentication vector and forwards the RAND and AUTN* portions of the authentication vector to the UE 110 in an Authentication Request message.

At event 178, the UE 110 derives the KEY shared by the UE 110 and the home network 140 and calculates AUTN=AUTN* (XOR) $(PuKey)_{KEY}$ using the shared KEY or, in another embodiment, using the home network PrKey. That is, the reverse of the XOR operation performed by the home network 140 may be performed. Using the KEY shared by the UE 110 and the home network 140, the UE 110 obtains the SN PuKey sent by the home network 140 and ensures that the instance of the SN PuKey sent by the home network 140 is the same as the instance of the SN PuKey broadcast by the serving network 130 at event 162. In this way, the UE 110 confirms that the serving network 130 that broadcast the SN PuKey has been authenticated and validated by the home network 140.

That is, when the UE 110 verifies the AUTN to authenticate the home network 140 and verifies that the received SN PuKey in AUTN* is the same as the broadcast SN PuKey, the UE thereby determines that the home network 140 has authenticated and validated the serving network 130, and therefore the UE 110 can reliably access network services using the serving network 130. The UE 110 then saves the SN PuKey for use in future attempts by the UE 110 to gain access to the serving network 130.

Existing authentication procedures are then followed by the UE 110 and the serving network 130 in the remainder of FIG. 1. At event 180, the UE 110 calculates a RES and sends the RES to the serving network 130. At event 182, the serving network 130 authenticates the UE by determining that RES=XRES. At event 184, the serving network 130 sends a Security Mode Command message to the UE 110. The UE 110 responds to the serving network 130 with a Security Mode Complete message at event 186.

When the above steps have been completed between a UE and a serving network or an access point, the serving network or access point remains authenticated and validated to the UE, and such a procedure does not need to be performed again between the UE and the serving network or access point until the next mandated authentication based on policy or configuration.

Figure 2:
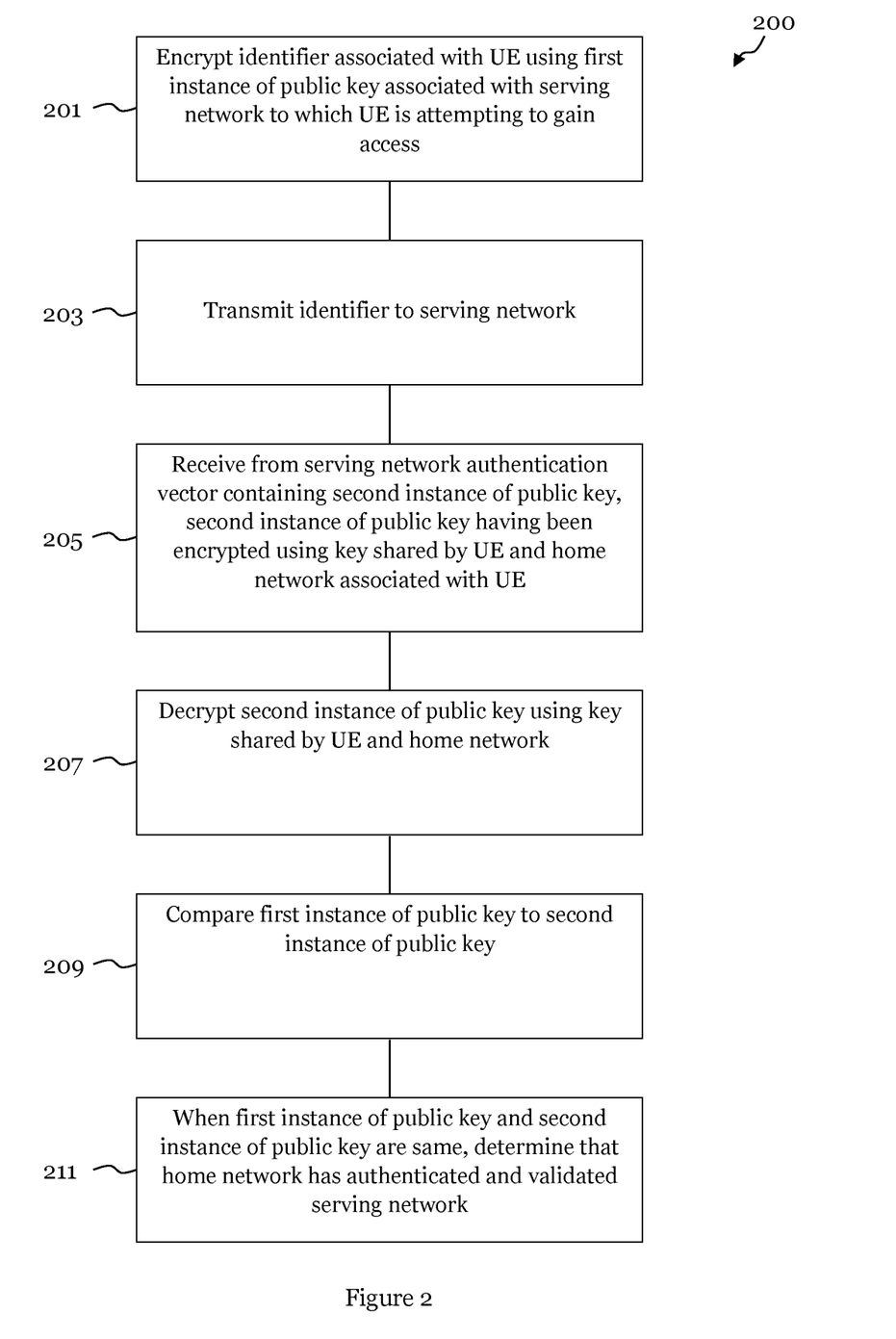
FIG. 2 is a flowchart illustrating an embodiment method for serving network authentication and validation by a UE.

FIG. 2 is a flowchart illustrating an embodiment method 200 for serving network authentication and validation by a UE. At block 201, an identifier associated with the UE is encrypted using a first instance of a public key associated with a serving network to which the UE is attempting to gain access. At block 203, the identifier is transmitted to the serving network. After transmitting of the identifier, at block

205, an authentication vector containing a second instance of the public key is received from the serving network, the second instance of the public key having been encrypted using a key shared by the UE and a home network associated with the UE. At block 207, the second instance of the public key is decrypted using the key shared by the UE and the home network. At block 209, the first instance of the public key is compared to the second instance of the public key. At block 211, when the first instance of the public key and the second instance of the public key are the same, the home network is determined to have authenticated and validated the serving network.

Figure 3:
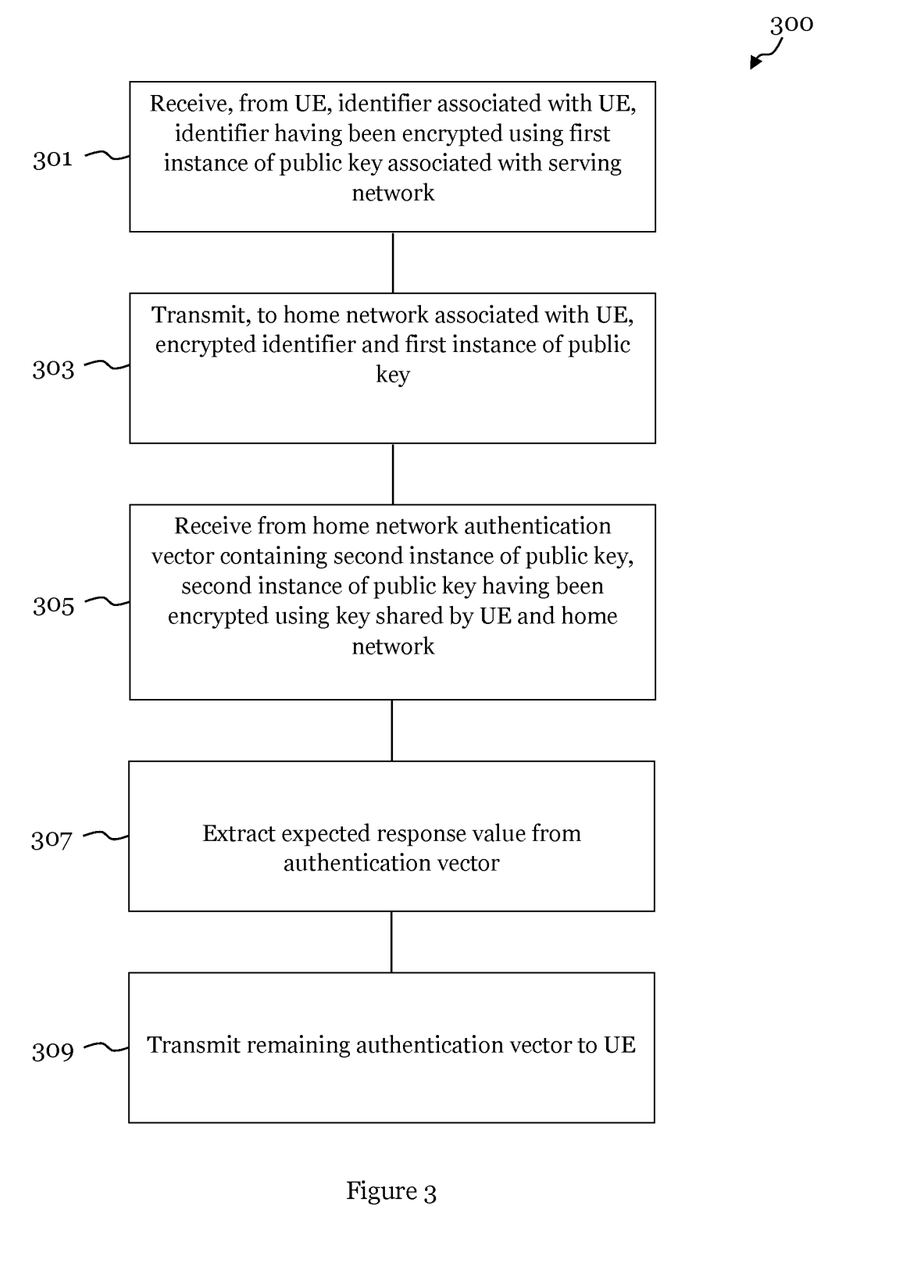
FIG. 3 is a flowchart illustrating an embodiment method for serving network authentication and validation by a serving network.

FIG. 3 is a flowchart illustrating an embodiment method 300 for serving network authentication and validation by a serving network. At block 301, an identifier associated with a UE is received from the UE, the identifier having been encrypted using a first instance of a public key associated with the serving network. At block 303, the encrypted identifier and the first instance of the public key are transmitted to a home network associated with the UE. After transmitting the encrypted identifier and the first instance of the public key, at block 305, an authentication vector containing a second instance of the public key is received from the home network, the second instance of the public key having been encrypted using a key shared by the UE and the home network. At block 307, an expected response value is extracted from the authentication vector. At block 309, the remaining authentication vector is transmitted to the UE.

Figure 4:
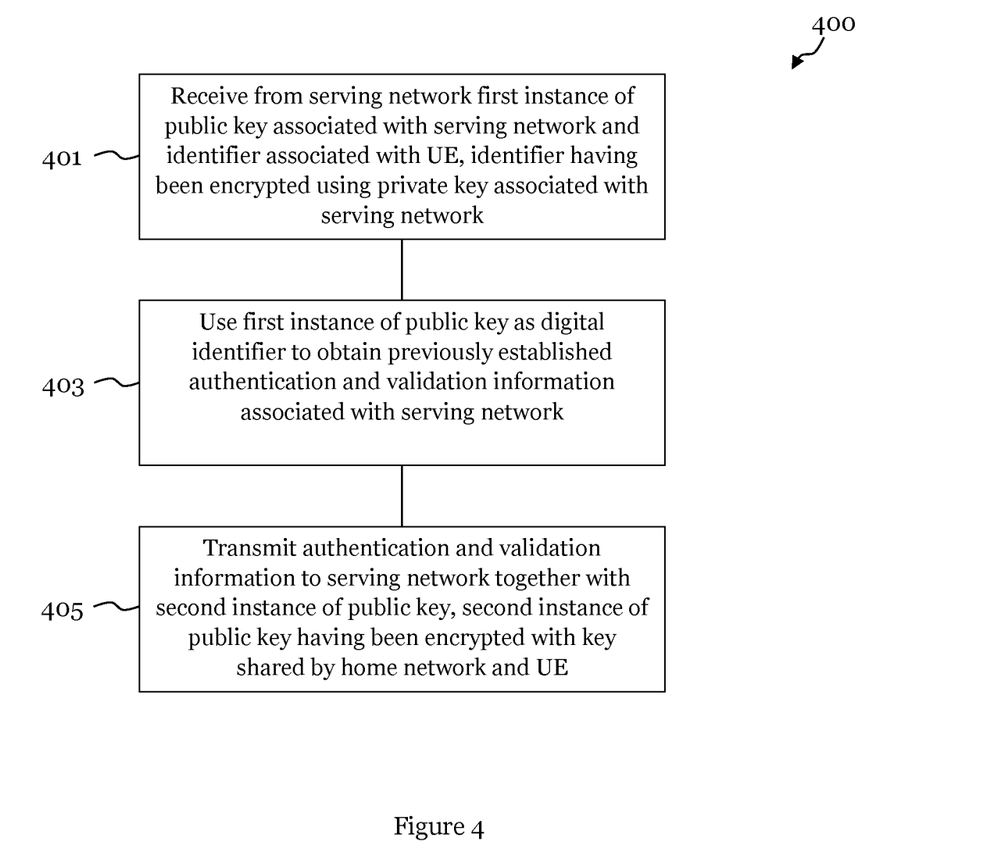
FIG. 4 is a flowchart illustrating an embodiment method for serving network authentication and validation by a home network.

FIG. 4 is a flowchart illustrating an embodiment method 400 for serving network authentication and validation by a home network. At block 401, a first instance of a public key associated with a serving network and an identifier associated with a UE are received from the serving network, the identifier having been encrypted using a private key associated with the serving network. At block 403, the first instance of the public key is used as a digital identifier to obtain previously established authentication and validation information associated with the serving network. At block 405, the authentication and validation information is transmitted to the serving network together with a second instance of the public key associated with the serving network, the second instance of the public key having been encrypted with a key shared by the home network and the UE.

Figure 5:
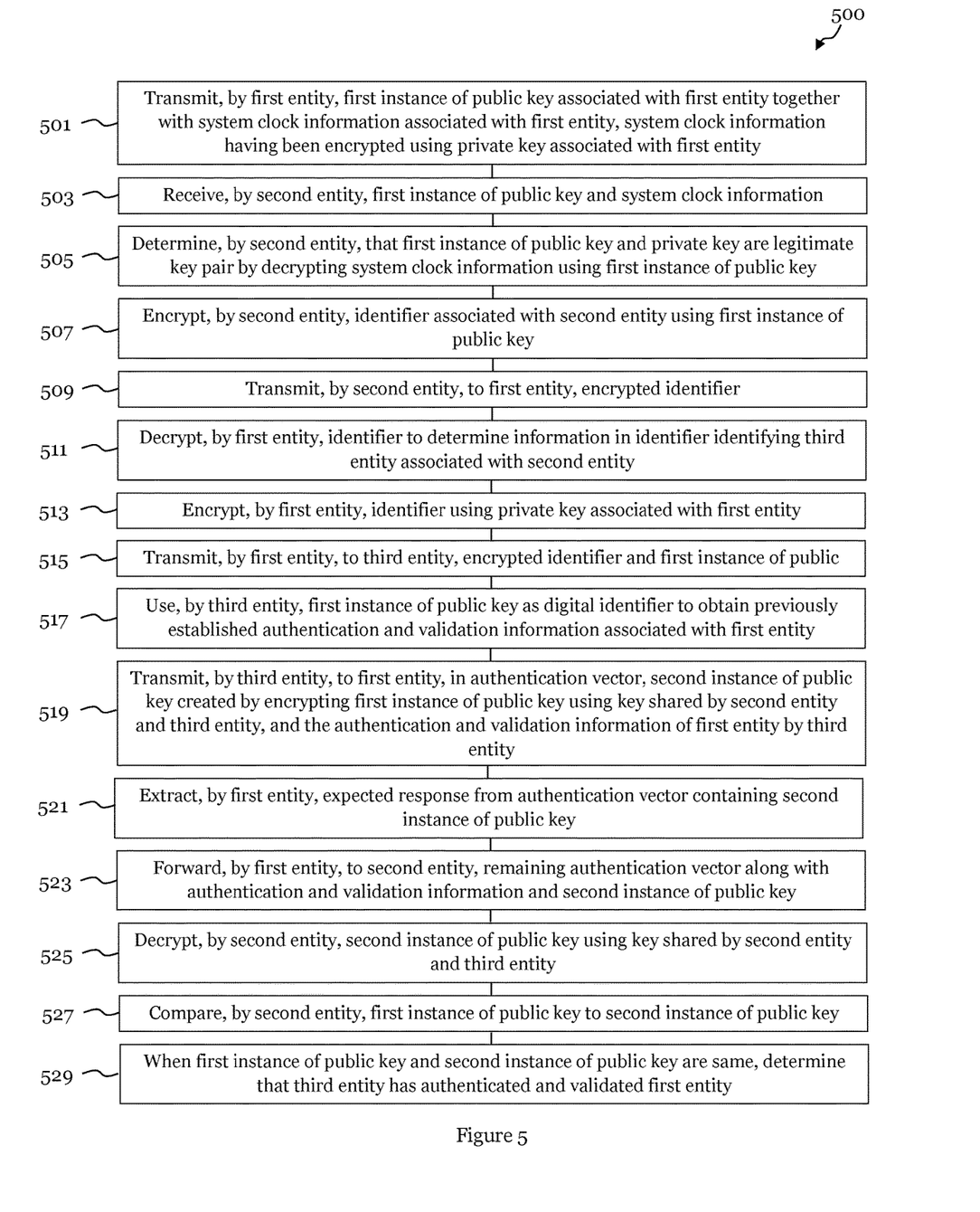
FIG. 5 is a flowchart illustrating an embodiment method for three-way authentication.

FIG. 5 is a flowchart illustrating an embodiment method 500 for three-way authentication. At block 501, a first entity transmits a first instance of a public key associated with the first entity together with system clock information associated with the first entity, the system clock information having been encrypted using a private key associated with the first entity. At block 503, a second entity receives the first instance of the public key and the system clock information. At block 505, the second entity determines that the first instance of the public key and the private key are a legitimate key pair by decrypting the system clock information using the first instance of the public key. At block 507, the second entity encrypts an identifier associated with the second entity using the first instance of the public key. At block 509, the second entity transmits the encrypted identifier to the first entity. At block 511, the first entity decrypts the identifier to determine information in the identifier identifying a third entity associated with the second entity. At block 513, the first entity encrypts the identifier using the private key associated with the first entity. At block 515, the first entity transmits to the third entity the encrypted identifier and the first instance of the public key. At block 517, the third entity uses the first instance of the public key as a digital identifier to obtain previously established authentication and validation information associated with the first entity. At block 519, the third entity transmits to the first entity, in an authentication vector, a second instance of the public key created by encrypting the first instance of the public key using a key shared by the second entity and the third entity, and the authentication and validation information of the first entity by the third entity. At block 521, the first entity extracts an expected response from the authentication vector containing the second instance of the public key. At block 523, the first entity forwards to the second entity the remaining authentication vector along with authentication and validation information and the second instance of the public key. At block 525, the second entity decrypts the second instance of the public key using the key shared by the second entity and the third entity. At block 527, the second entity compares the first instance of the public key to the second instance of the public key. At block 529, when the first instance of the public key and the second instance of the public key are the same, the second entity determines that the third entity has authenticated and validated the first entity.

Figure 6:
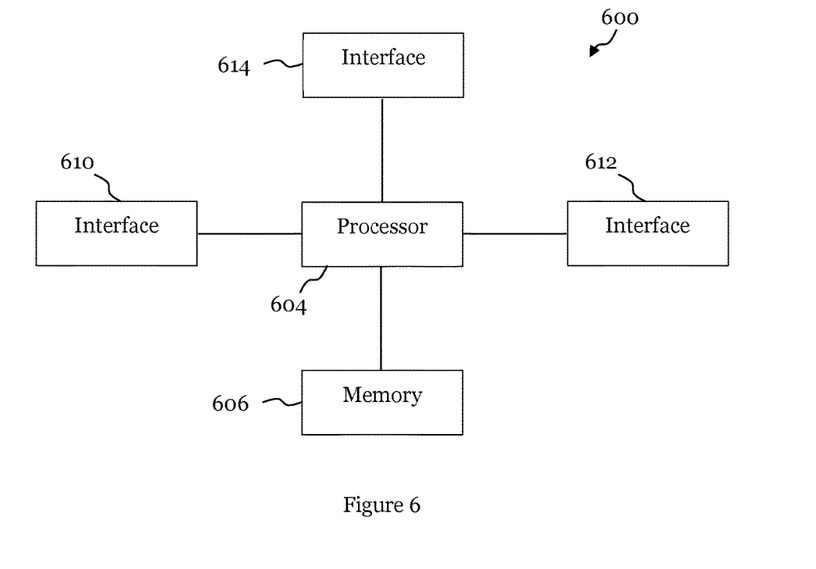
FIG. 6 is a block diagram illustrating an embodiment processing system for performing methods described herein.

FIG. 6 is a block diagram illustrating an embodiment processing system 600 for performing methods described herein, which may be installed in a host device. As shown, the processing system 600 includes a processor 604, a memory 606, and interfaces 610-614, which may (or may not) be arranged as shown in the figure. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in the figure, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
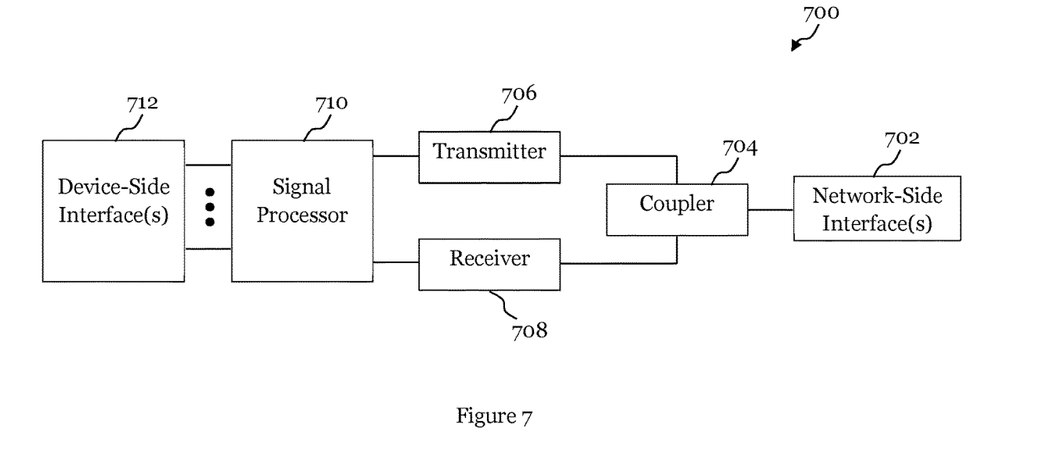
FIG. 7 is a block diagram illustrating an embodiment transceiver adapted to transmit and receive signaling over a telecommunications network.

In some embodiments, one or more of the interfaces 610, 612, 614 connects the processing system 600 to a transceiver adapted to transmit and receive signaling over the telecommunications network. FIG. 7 is a block diagram illustrating a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   encrypting, by a user equipment (UE), an identifier associated with the UE using a public key to generate an encrypted identifier, the public key being associated with a serving network to which the UE is attempting to gain access;
   transmitting, by the UE, the encrypted identifier to the serving network;
   receiving, by the UE from the serving network, an authentication vector comprising a first key, the first key having been encrypted using a second key shared by the UE and a home network associated with the UE;
   decrypting, by the UE, the first key using the shared second key to obtain a decrypted first key;
   comparing, by the UE, the public key to the decrypted first key; and
   authenticating, by the UE, the serving network when the UE determines that the public key and the decrypted first key are the same.

2. The method of claim 1, further comprising:
   receiving, by the UE from the serving network, the public key and current serving network system clock information, the current serving network system clock information being encrypted using a private key associated with the serving network.

3. The method of claim 2, further comprising:
   decrypting the current serving network system clock information using the public key.

4. The method of claim 1, wherein decrypting the first key comprises:
   performing an XOR operation on a digital value in the authentication vector and the first key.

5. The method of claim 1, wherein the authentication vector comprises a quality rating of the serving network.

6. The method of claim 1, further comprising:
   saving, by the UE, an instance of the public key and the authentication vector for future access to the serving network by the UE.

7. A method comprising:
   receiving, by a serving network from a user equipment (UE) that is attempting to gain access to the serving network, a first encrypted identifier associated with the UE;
   transmitting, by the serving network, an authentication request message to a home network associated with the UE, the authentication request message requesting the home network to authenticate the serving network, and the authentication request message comprising a second encrypted identifier associated with the UE and a public key of the serving network;
   receiving, by the serving network from the home network, an authentication vector comprising information indicating whether the serving network is authenticated, the authentication vector comprising a first key that has been encrypted using a second key shared by the UE and the home network; and
   transmitting, by the serving network, the authentication vector to the UE for the UE to authenticate the serving network.

8. The method of claim 7, further comprising:
   decrypting, by the serving network, the first encrypted identifier using a private key associated with the serving network, to generate a decrypted identifier; and determining, by the serving network, the home network in accordance with the decrypted identifier.

9. The method of claim 8, further comprising:
encrypting, by the serving network, the decrypted identifier using the private key to obtain the second encrypted identifier.

10. The method of claim 7, further comprising:
prior to receiving the first encrypted identifier, transmitting, by the serving network, the public key and current serving network system clock information, the current serving network system clock information being encrypted using a private key associated with the serving network.

11. The method of claim 7, wherein the authentication vector comprises a quality rating of the serving network.

12. A method comprising:
receiving, by a home network of a user equipment (UE) from a serving network, an authentication request message that requests the home network to authenticate the serving network, the authentication request message comprising an encrypted identifier associated with the UE and a public key associated with the serving network;
authenticating, by the home network using the public key, the serving network;
generating, by the home network, an authentication vector comprising information indicating whether the serving network is authenticated, the authentication vector comprising a first key encrypted with a second key shared by the home network and the UE; and
transmitting, by the home network to the serving network, the authentication vector.

13. The method of claim 12, wherein authenticating the serving network comprises:
obtaining, by the home network using the public key, previously established authentication and validation information of the serving network via a blockchain network.

14. The method of claim 12, further comprising:
decrypting, by the home network, the encrypted identifier of the UE using the public key, to obtain a decrypted identifier; and
determining, by the home network based on the decrypted identifier, whether the UE is allowed to access the serving network.

15. The method of claim 12, further comprising:
generating, by the home network, the first key by encrypting the public key using the second key shared by the home network and the UE.

16. The method of claim 15, further comprising:
encrypting, by the home network, the first key by performing an XOR operation on a stored digital value and the first key.

17. The method of claim 12, wherein the authentication vector comprises a quality rating of the serving network.

18. A method comprising:
transmitting, by a serving network, a public key associated with the serving network and current system clock information associated with the serving network, the current system clock information having been encrypted using a private key associated with the serving network;
receiving, by a user equipment (UE), the public key and the current system clock information of the serving network;
encrypting, by the UE when attempting to access the serving network, an identifier associated with the UE using the public key, to generate a first encrypted identifier of the UE;
transmitting, by the UE to the serving network, the first encrypted identifier;
decrypting, by the serving network, the first encrypted identifier, to obtain the identifier of the UE, and determining, by the serving network, a home network associated with the UE;
encrypting, by the serving network, the identifier of the UE using the private key associated with the serving network to obtain a second encrypted identifier of the UE;
transmitting, by the serving network to the home network, an authentication request message requesting the home network to authenticate the serving network, the authentication request message comprising the second encrypted identifier of the UE and the public key;
authenticating, by the home network using the public key, the serving network, and generating, by the home network, an authentication vector comprising information indicating whether the serving network is authenticated, the authentication vector comprising a first key encrypted with a second key shared by the home network and the UE;
transmitting, by the home network to the serving network, the authentication vector;
extracting, by the serving network, an expected response from the authentication vector;
forwarding, by the serving network to the UE, remaining authentication vector comprising the first key;
decrypting, by the UE, the first key using the second key shared by the UE and the home network;
comparing, by the UE, the public key to the decrypted first key; and
authenticating, by the UE, the serving network when the UE determines that the public key and the decrypted first key are same.

19. The method of claim 18, wherein the authentication vector comprises a quality rating of the serving network.

20. The method of claim 18, further comprising:
obtaining, by the home network based on the public key of the serving network, previously established authentication and validation information of the serving network via a blockchain network.

21. A user equipment (UE) comprising:
a non-transitory memory storage comprising instructions; and
one or more processors in communication with the non-transitory memory storage, wherein the instructions, when executed by the one or more processors, cause the UE to perform:
encrypting an identifier associated with the UE using a public key to generate an encrypted identifier, the public key being associated with a serving network to which the UE is attempting to gain access;
transmitting the encrypted identifier to the serving network;
receiving, from the serving network, an authentication vector comprising a first key, the first key having been encrypted using a second key shared by the UE and a home network associated with the UE;
decrypting the first key using the shared second key to obtain a decrypted first key;
comparing the public key to the decrypted first key; and authenticating the serving network when the UE determines that the public key and the decrypted first key are the same.

22. The UE of claim 21, wherein decrypting the first key comprises:
performing an XOR operation on a digital value in the authentication vector and the first key.

23. The UE of claim 21, wherein the authentication vector comprises a quality rating of the serving network.

* * * * *